Feb. 5, 1929. 1,701,469
F. W. BAKER
VEHICLE WHEEL WITH CONCENTRIC RIM
Filed Sept. 23, 1925 4 Sheets-Sheet 1
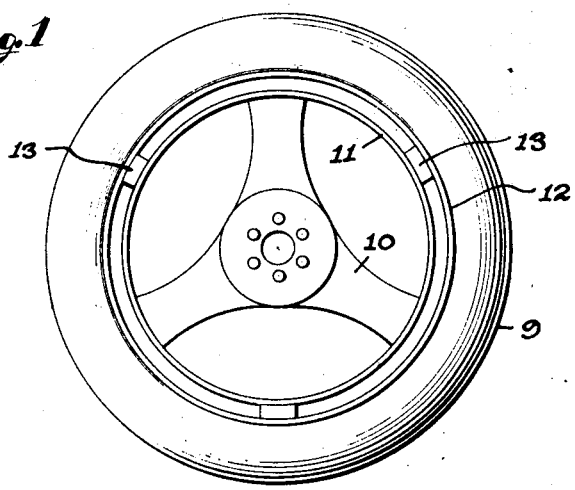
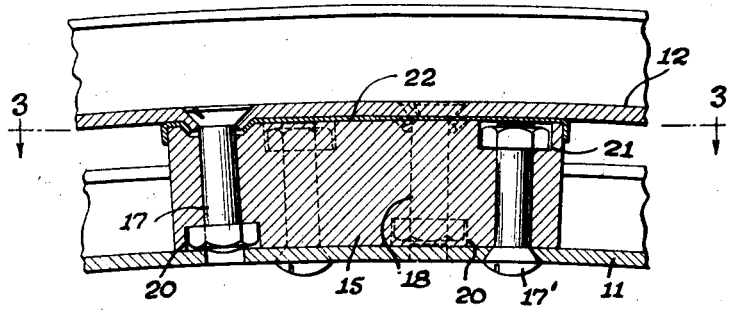
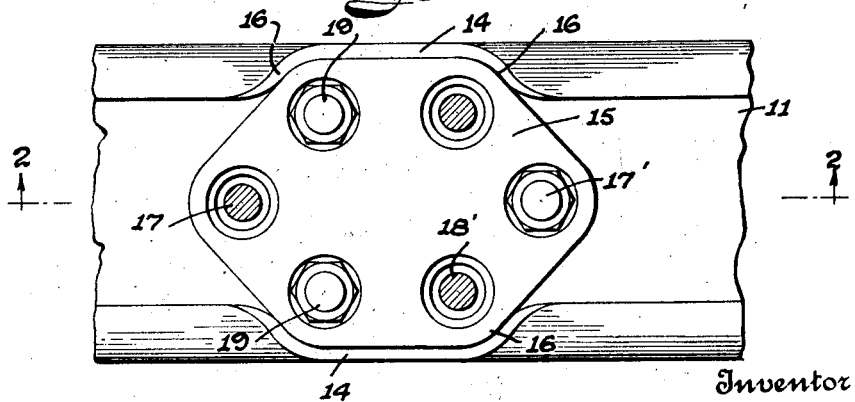
Inventor
Frederick William Baker.
By his Attorney.
Ramsay Hoguet.

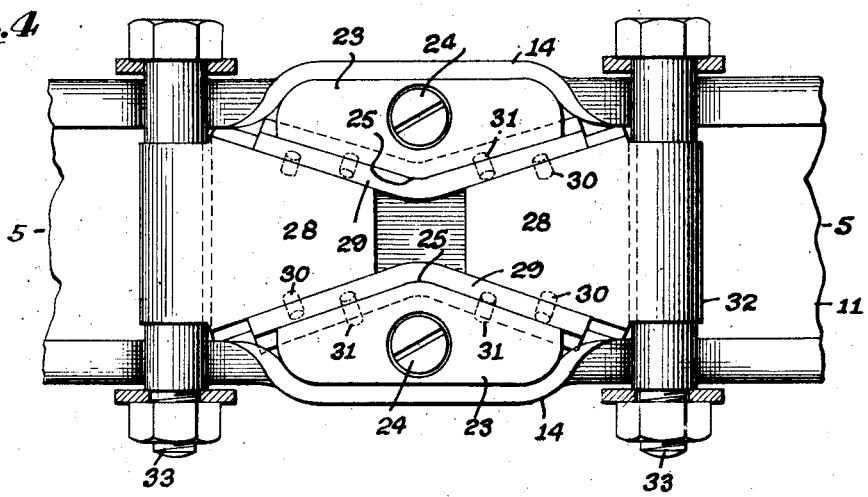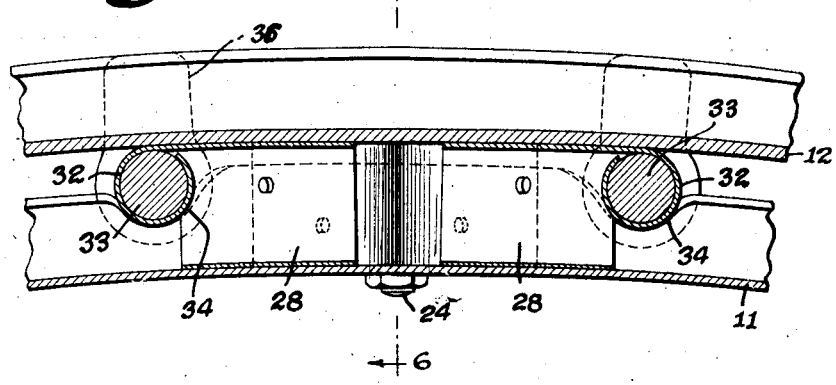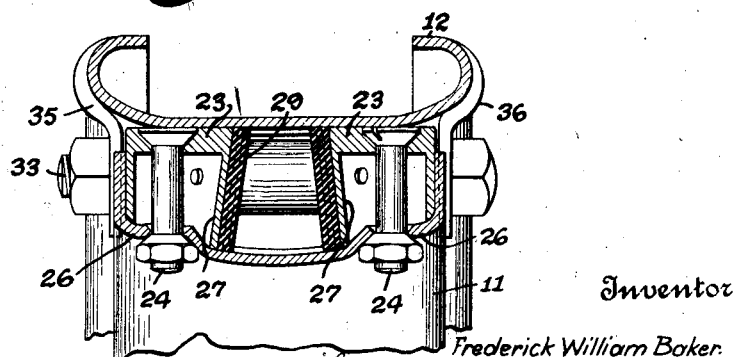

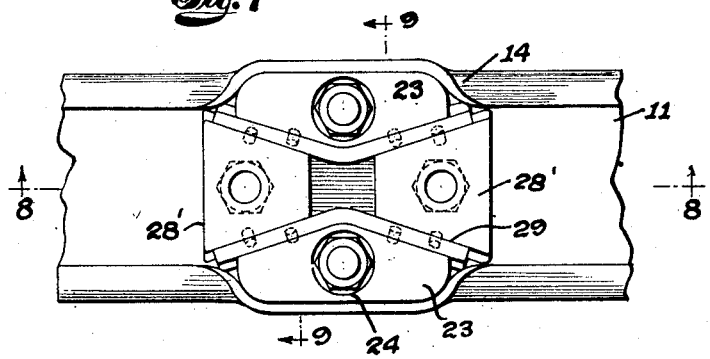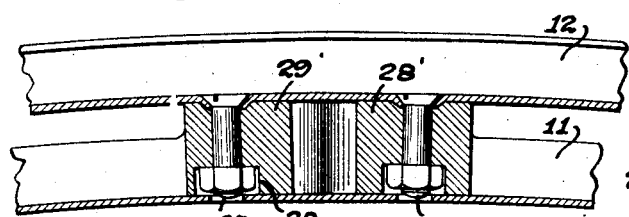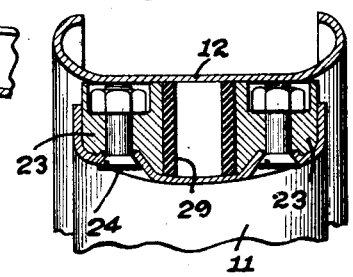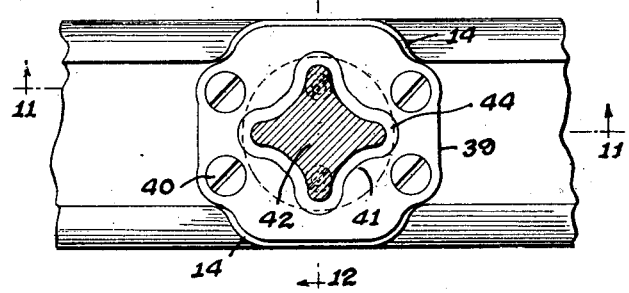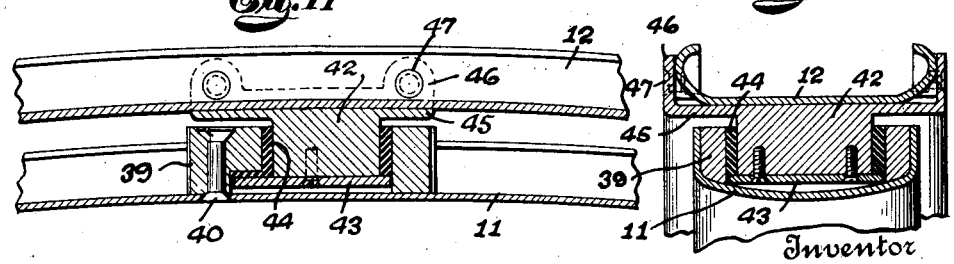
Inventor
Frederick William Baker.
By his Attorney,
Ramsay Hoguet

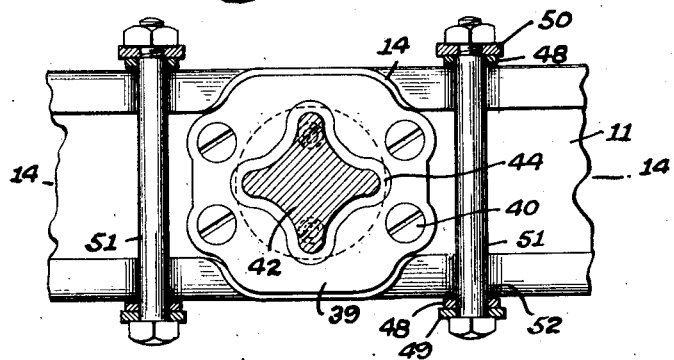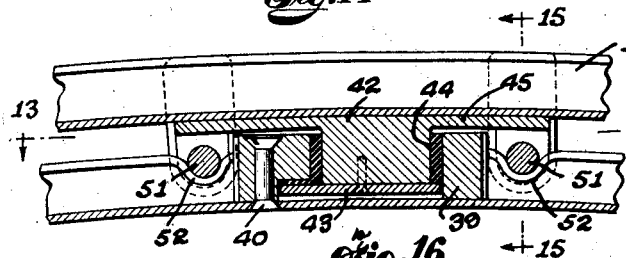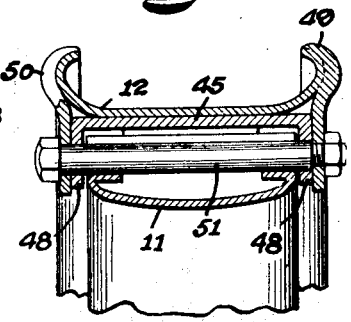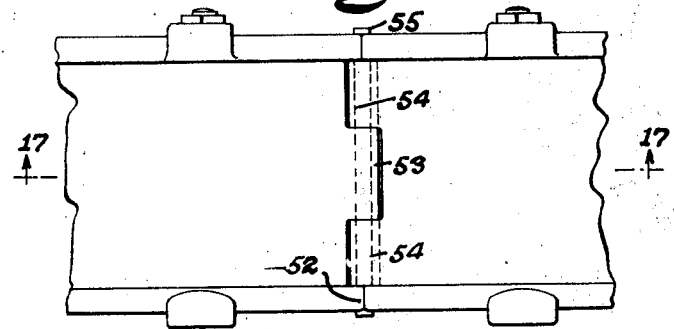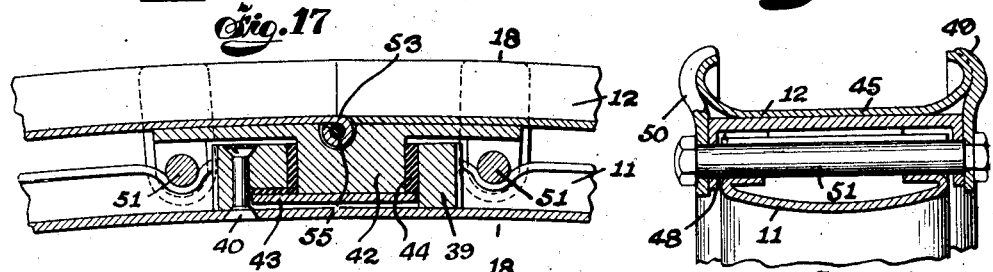

Patented Feb. 5, 1929.

1,701,469

UNITED STATES PATENT OFFICE.

FREDERICK WILLIAM BAKER, OF STOURBRIDGE, ENGLAND.

VEHICLE WHEEL WITH CONCENTRIC RIM.

Application filed September 23, 1925. Serial No. 58,137.

My invention relates to that type of vehicle wheel which comprises a plurality, usually two, of rims secured together at convenient intervals by distance pieces, the inner rim being connected with the hub member and the outer rim carrying the tire. Such types of wheels have usually been constructed with metallic blocks, springs, bolts or distance pieces of some kind spaced apart and connecting the inner and outer rims, but these connections have been unsatisfactory because sooner or later they have given way under the peculiar forces applied or fail from fatigue, crystallization or other causes due to strains necessarily imparted by the functioning of the wheel under load and speed stresses. One object of my invention is to obviate these difficulties by substituting for such connecting elements between the rims, members of yielding or resilient material which will form a strong and serviceable connection, but which are capable of yielding radially tangentially, laterally and in the direction of driving effort imparted to the wheel. By this arrangement the above mentioned and other destructive tendencies are obviated, and the wheel thus constructed assists in the shock absorbing functions of the wheel and tire.

One method of attaining my object is to use a fabric block which is secured to the inner and outer or intermediate rims independently, that is to say, the inner rim fastenings do not go through to the outer rim and they secure the block independently. Similarly, the fastenings to the outer rim are also independent and are staggered or spaced away from the fastenings to the inner rim, with the result that the drive or pull is effected through the block itself, and as will be obvious, will result in a flexible drive or pull to the respective rims.

It is important to have the resilient members fastened rigidly to both rims, but by independent fastenings, to the end that the resilient driving strain may be preserved and yet strength of connection maintained so that the resilient spacing members will not be stripped from the rim.

Other means for carrying this general idea into effect will appear from the description which follows, and in every instance I dispose the connecting elements between the rims so that these resilient elements will in themselves take up, as far as possible, the shocks in all directions and will remove any substantial strain from the bolts, rivets or fastenings which are used to hold the parts in place while at the same time preserving a strong connection between the rims.

Reference is to be had to the accompanying drawings forming a part of this specification, in which similar reference characters indicate corresponding parts in all the views.

Figure 1 is a diagrammatic elevation of a two rimmed wheel showing the general arrangement of parts.

Figure 2 is an enlarged detail section through the wheel rim in the plane of the wheel on the line 2—2 of Figure 3.

Figure 3 is a fragmentary sectional plan on the line 3—3 of Figure 2.

Figure 4 is a fragmentary sectional plan showing a modified arrangement of the connecting and bearing element between the rims.

Figure 5 is a section on the line 5—5 of Figure 4.

Figure 6 is a cross section through two rims of the wheel on the line 6—6 of Figure 5.

Figure 7 is a sectional plan showing a structure somewhat modified from that illustrated in Figure 4, in which the bearing and connecting element is fixed.

Figure 8 is a section on the line 8—8 of Figure 7.

Figure 9 is a cross section on the line 9—9 of Figure 7.

Figure 10 is a sectional plan of another modification of a fixed bearing and connecting element between the two rims.

Figure 11 is a section on the line 11—11 of Figure 10.

Figure 12 is a cross section on the line 12—12 of Figure 10.

Figure 13 is a sectional plan on the line 13—13 of Figure 14, showing a modification of the structure illustrated in Figure 10 and adapted for a demountable connection between the two rims.

Figure 14 is a section on the line 14—14 of Figure 13.

Figure 15 is a cross section on the line 15—15 of Figure 14.

Figure 16 is a fragmentary sectional plan illustrating another modification in which the outer rim is a split rim.

Figure 17 is a section through both rims on the line 17—17 of Figure 16, and

Figure 18 is a cross section on the line 18—18 of Figure 17.

The bearing and connecting elements between the two rims are indicated in a general way in Figure 1, in which 10 represents generally the three armed spoke system of the wheel, 11 the inner rim, 12 the outer rim spaced apart therefrom, and 13 the bearing and connecting elements between the rims, these being disposed intermediately between the ends of the spoke arms. This is the preferred arrangement, but obviously the connecting and bearing elements can be otherwise disposed without affecting the invention. The inner and outer rims 11 and 12 can be of any usual or preferred general conformation, and are illustrated in a conventional way with the outer rim having its side flanges arranged to engage the conventional tire 9.

Instead of having the bearing elements 13 rigid as heretofore, and metallic, I use a non-metallic and yielding element which as in Figures 2 and 3 may be a block 15 of resilient material, either solid or laminated, and as shown this block is seated in a socket 14 formed by bending the flanges of the inner rim 11 as shown clearly in Figure 3, and the member 15 is shaped to fit nicely in this socket, so that the end portions of the sides of the block will abut with the corresponding parts of the seat or socket as shown at 16 in Figure 3, and thus the strain imparted in driving the wheel will be taken up at these points without bringing much strain on the bolts or other fastenings which hold the block 15 in place. This resilient member 15 is fastened to both the inner and outer rims 11 and 12, and it can be done for example by bolts 17, 18 and 18', anchored in the block or passing through it and secured in the outer rim 12, the inner portions of the block being chambered as at 20 to receive the bolt nuts. Other fastenings 17', 19 and 19 extend similarly through the block and connect with the rim 11, the nuts of the fastening members being held in chambers 21 (see Figure 2). If desired the outer surface of the member 15 can be covered by a plate or cap 22, but this is not essential.

It will be noticed that in the structure herein described a strong yet yielding connection is made between the inner and outer rims, and this connecting member is adapted to yield slightly under either radial, tangential, lateral or other strain, particularly the strain imparted in the driving effort of the wheel, so that if the elements are disposed as in Figure 1, both rims turn as a unit, but the difficulties arising from rigid connections are eliminated.

In Figures 4 to 6 I have illustrated a modification in which the rims are demountable with respect to each other, and the connecting member is also demountable, while the resilient features of the connection are preserved. As here shown the seat or socket 14 is as already described, but non-resilient members 23 are secured in the seat and fitted to its walls by screw bolts 24 or the like, and the two members have each oppositely inclined walls, those of each member terminating in the apex 25, so that the space between the opposed members is narrowest at the center as shown in Figure 4.

The inner wall of the inner rim 11 can be shaped to form a seat for the nuts of the fastening bolts 24 as shown at 26 in Figure 6, and the members 23 have their inner walls inclined as stated, and these walls are also inclined to form a dovetail slot between them, and the walls of opposed members diverge inwardly as shown at 27 in Figure 6. The object of this is to make a securer connection with the members 28, which are spaced as in Figure 4, and fit between the opposite diverging parts of the side members 23. The members 28 are widest at their inner parts so as to dovetail between the members 23 as described, and a resilient bushing or gasket 29 is placed between the members 23 and the members 28, the gasket on each side being continuous preferably, as shown in Figure 4, and it can be held in place by screws or rivets 30 and 31, or the like, these serving to fasten the resilient material to both the non-resilient members 23 and 28 so as to prevent its displacement. As a convenient means of connecting the members 28 to the outer rim 12, each member 28 can have one end portion formed into an eye or sleeve 32 through which a bolt or pintle 33 is run, and these bolts or similar fastenings project through corresponding depressions 34 of the flanges of the inner rim 11, and the bolts 33 also engage the ears or lugs 35 and 36 which serve to connect the bolts with the flanges of the outer rim 12.

In order that the structure may be demountable and permit of the ready separation of the rims, the ears 35 are shaped to fit over the flanges of the outer rim 12 to which they are unattached, and to receive the bolts 33 which pass through them, while on the other hand the ears or lugs 36 can be brazed or otherwise fastened to the flanges of the rim 12. Thus it will be seen that by removing the nuts from the bolts 33, the lugs or ears 35 can be removed, and the rim 12 then pulled off laterally, the bolts 33 slipping from their connections.

It will be observed that the structure shown in Figures 4 to 6 above described, has the same function as that previously described, except that it is not so resilient in a radial direction; but in the principal direction of strain, that is against the effort to drive the wheel and in lateral strain, the shock is absorbed in part by the yielding bushings 29, and if these are of sufficient height, they will also serve to absorb in part the radial strain of the connection.

In Figures 7 to 9 I have shown a slight modification of the structure shown in Figures 4 to 6, which is simpler, but which is not demountable. In this instance the members 23 are disposed as already described, fastened in a similar way, but the members 28' similar to the members 28 just described, are rigidly secured to the outer rim 12 by bolts 37 or equivalent fastenings, and the members are chambered as shown at 38 to receive the nuts. Thus as in the previous structures described, one part of the connecting and bearing element between the rims is connected to one rim, another to the second rim, and the strains are transmitted and absorbed in part through the two parts of the connecting element.

In Figures 10 to 12 is shown another modification of the structure in which the same general idea is carried out in a slightly different way. As here shown a non-resilient member 39 is seated in the socket 14 as already described, and is fastened to one rim, the inner rim as shown, by screw bolts 40 or the like. This member or block 39 has in the middle and extending through it, an irregular opening 41 which preferably is regular shaped as shown, generally like a Geneva gear, and into this fits a block 42 secured to the outer rim as described below. A plate 43 can be secured to the inner side of the block (see Figure 11) so as to overlap the side walls of the opening 41 to prevent the removal of the part 42, and a resilient bushing or gasket 44 is placed between the members 39 and 42 so as to provide the necessary yielding element in the connection. The block 42 might be connected to the outer rim in any convenient way, but I have shown it as provided with a lateral flange 45 which may or may not be integral with the block and which has outturned side flanges 46 preferably formed into ears, which are secured by fastenings 47 to the outer rim 12. Thus the connection between the two rims is strong but yielding, as already described.

In Figures 13 to 15 I have shown a structure like that just described except that it is demountable. To this end the flange 45 instead of being outturned at the outer side as shown, is inturned to form the side flanges 48, which thus straddle the inner rim 11 (see Figure 15) and ears 49 and 50, like the parts 35 and 36 previously referred to, form the connection between the block 42 and the outer rim. For instance, the lugs or ears 49 are fixed to the outer rim 12, while the corresponding parts 50 are loose thereon, but conform to the contour of the rim flanges. The opposed lugs 49 and 50 are secured by through bolts 51 having suitable nuts thereon, and thus the block 42 is anchored to the outer rim 12, but by removing the nuts of the bolts 51, and slipping off the loose ears or lugs 50, the rim 12 can as already described, be pulled off sidewise from the wheel, the bolts 51 in such case slipping from their connections.

In Figures 16 to 18 I have shown another slight modification which can well be applied to the structure just described, or to a similar connection, but in which the outer rim 12 is shown as a split rim. In this case it is split transversely as at 52, and as a convenient connection between the two end portions of the rim 12, one end of the rim can be formed into a hinge eye 53 which enters between corresponding eyes 54 on the opposite end of the rim, while a pintle or bolt 55 is extended through both sets of eyes to form a connection. This structure can be used to advantage in that form of connection illustrated in Figures 13 to 15.

The foregoing examples should make it clear that there are a great many ways of introducing a resilient bearing and connecting element between the inner and outer rims in a manner to act as a cushion and also a reliable and resilient drive transmitter without affecting the invention, and it will also be evident that more concentric rims might be similarly added if desired without affecting the invention.

From the foregoing description it will be seen that my invention is quite different from what is known in the art as resilient wheels, as these latter are all subject to deformation because the resilient parts of the wheel are subject to considerable expansion and contraction, and the outer rim or felly is movable bodily with relation to the center of the wheel. This is such bad practice that such wheels are never commercially used. My invention, on the other hand, it will be seen limits the driving effort to such an extent that there is no appreciable deformation of the resilient connecting members between the rims, or of the wheel as a whole, the resilient members being unrestricted radially in their movements because this movement if the right material is used, is very limited, and in the other directions the resilient members are restricted to such an extent by their seats and fastenings that they have no appreciable movement, but simply serve to take up and absorb the shock and prevent the clash of metal to metal parts. Furthermore, in the preferred arrangement of the invention it will be seen that the members between the rims are spaced so as to permit a certain springiness of the rims, and particularly the outer rims, thus providing for the absorption of shock between adjacent bearing members between the rims and in the rims themselves.

Additionally, by reason of the clustering of the means for retaining the members between the rim parts only at the points of location of these members, it will restrict the inherent yieldability or resiliency of said members and thereby limit movements of the rim parts of the wheel and confine the functioning of said members for the purposes hereinbefore stated.

I claim:

1. In a wheel of the kind described, spaced concentrically arranged rim parts, yieldable bearings at intervals between the rim parts, and radial projections on each rim part for engaging said bearings through a radial distance substantially equal to the distance between the rim parts to permit slight movements of the rim parts relative to each other.

2. In a wheel of the kind described, spaced concentrically arranged rim parts, yieldable bearings at intervals between the rim parts, and radial projections on each rim part and independent of the other part and engaged only with the bearings to permit slight movements of the rim parts relative to each other, said projections being substantially equal to the distance between the rim parts.

3. In a wheel of the kind described, an inner rim, an outer rim, resilient members located at intervals circumferentially between the rims, and clustered fasteners coacting with the members through a radial distance substantially equal to the distance between the rim parts and oppositely connecting the same with the rims.

4. In a wheel of the character described, an outer rim, an inner rim, non-metallic members spaced apart between the rims, radial projections anchoring said members to the outer rim, and means anchoring said members to the inner rim and coacting with the projections through a radial distance substantially equal to the distance between the rim parts to restrict movements of the rims relative to each other.

5. In a wheel of the character described, an outer rim, an inner rim, non-metallic members spaced apart between the rims, radial projections anchoring said members to the outer rim, and means anchoring said members to the inner rim and coacting with the projections through a radial distance substantially equal to the distance between the rim parts to restrict movements of the rims relative to each other, said projections and means being clustered with respect to said members.

6. In a wheel of the character described, an inner rim to which a driving effort may be applied, an outer rim driven from the inner rim, a plurality of yieldable means interposed at intervals circumferentially between said rims and adapted to transmit said driving effort, and radial projections carried on the respective rims and devoid of positive connection of the same together and anchored in the first named means, said projections engaging said yieldable means through a radial distance substantially equal to the distance between the rim parts for coaction with the first named means to restrict the movements of the rims relative to each other.

In testimony whereof, I have signed my name to this specification this 17th day of September, 1925.

FREDERICK WILLIAM BAKER.